(12) United States Patent
Zhou et al.

(10) Patent No.: US 10,059,018 B2
(45) Date of Patent: Aug. 28, 2018

(54) C-TYPE TUBING CUTTER

(71) Applicant: Ridge Tool Company, Elyria, OH (US)

(72) Inventors: Michael Zhou, Shanghai (CN); Frank Wu, Shanghai (CN); Harald Krondorfer, Aurora, OH (US); Gina Hartman, Cleveland, OH (US); Glen R. Chartier, Avon Lake, OH (US); Alex M. Cole, Parma, OH (US); Richard R. Bowles, Solon, OH (US); Ben Azzam, Avon Lake, OH (US); Adam Bird, Cheswick, PA (US); Frederick D. Pond, Lagrange, OH (US)

(73) Assignee: Ridge Tool Company, Elyria, OH (US)

( * ) Notice: Subject to any disclaimer, the term of this patent is extended or adjusted under 35 U.S.C. 154(b) by 0 days.

(21) Appl. No.: 15/402,527

(22) Filed: Jan. 10, 2017

(65) Prior Publication Data

US 2018/0194029 A1 Jul. 12, 2018

(51) Int. Cl.
| | | |
|---|---|---|
| B23D 21/08 | (2006.01) | |
| B26D 3/16 | (2006.01) | |
| B26D 7/26 | (2006.01) | |
| B26B 25/00 | (2006.01) | |

(52) U.S. Cl.
CPC ............ B26D 3/169 (2013.01); B26B 25/005 (2013.01); B26D 7/2628 (2013.01)

(58) Field of Classification Search
CPC ........ B23D 21/04; B23D 21/08; B26D 3/169; B26D 7/2628

USPC .................................................. 30/101, 102
See application file for complete search history.

(56) References Cited

U.S. PATENT DOCUMENTS

| | | | | |
|---|---|---|---|---|
| 2,706,853 A | * | 4/1955 | Wilson ................... | B23D 21/08 30/102 |
| 2,796,663 A | * | 6/1957 | Karnes ................... | B23D 21/08 30/102 |
| 3,237,301 A | * | 3/1966 | Wilson ................... | B23D 21/08 30/102 |
| 3,335,492 A | | 8/1967 | Spiro | |
| 4,769,911 A | * | 9/1988 | Araki ..................... | B23D 21/04 30/94 |
| 4,831,732 A | | 5/1989 | Garton | |
| 5,285,576 A | | 2/1994 | Taylor | |
| 8,266,991 B2 | * | 9/2012 | Thorson ................. | B23D 21/04 30/101 |
| 8,573,099 B2 | | 11/2013 | Huang | |
| 2005/0086809 A1 | | 4/2005 | Myers | |
| 2012/0247286 A1 | | 10/2012 | Huang | |
| 2017/0173710 A1 | * | 6/2017 | Zhou ...................... | B23D 21/08 |

* cited by examiner

*Primary Examiner* — Hwei C Payer
(74) *Attorney, Agent, or Firm* — Mark E. Bandy; Rankin, Hill & Clark LLP

(57) ABSTRACT

A C-type tubing cutter is described that accommodates and cuts a range of tubing or workpiece sizes. The cutter includes a radially positionable roller carriage that can be selectively positioned in one of several predetermined positions corresponding to different tubing sizes. The cutter also includes a trigger that can be engaged with the roller carriage to lock the carriage in a desired position. Certain versions of the cutters also utilize arcuate slots or tracks along which a cutter wheel is positionable.

23 Claims, 6 Drawing Sheets

C-TYPE TUBING CUTTER

FIELD

The present subject matter relates to C-type tubing cutters that can accommodate a range of tubing sizes.

BACKGROUND

A wide variety of handheld C-type tubing cutters are known in the art. Many cutters are fixed size cutters limited to use with only one size tubing or pipe. However, several multi-size tubing cutters have been proposed.

Certain known multi-size C-type tubing cutters utilize radially positionable rollers which are positioned depending upon the diameter of the tubing to be cut. Although satisfactory in many regards, accommodating different tubing sizes by adjustment of such rollers is time consuming and can be tedious. Accordingly, a need exists for a cutter that can accommodate a range of tubing sizes and which can be quickly and easily configured to change between specific sizes within that range.

SUMMARY

The difficulties and drawbacks associated with previous approaches are addressed in the present subject matter as follows.

In one aspect, the present subject matter provides a tubing cutter comprising a housing defining a work region for receiving a workpiece to be cut. The tubing cutter also comprises a radially positionable roller carriage having at least one roller accessible along the work region of the housing. The tubing cutter additionally comprises a cutting wheel supported within the housing and accessible along the work region of the housing. And, the tubing cutter comprises a size indexing assembly for selectively positioning the roller carriage relative to the cutting wheel in one of a plurality of predetermined positions corresponding to sizes of workpieces.

In another aspect, the present subject matter provides a tubing cutter comprising a housing defining a first outer face, a second outer face oppositely directed from the first face, a work region for receiving a workpiece to be cut and a trigger slot. The trigger slot is accessible along at least one of the first and second outer faces. The tubing cutter also comprises a trigger moveable along the trigger slot. The cutter also comprises at least one selectively and radially positionable roller accessible in the work region. The cutter additionally comprises a cutting wheel rotatably supported by the housing and accessible in the work region. The roller can be affixed in a desired radial position by engagement with the trigger.

In still another aspect, the present subject matter provides a tubing cutter comprising a housing having an outer face and defining a work region for receiving a workpiece to be cut. The housing also defines a first arcuate slot and a second arcuate slot, both first and second arcuate slots accessible along the outer face of the housing. The cutter also comprises a moveable trigger positionable within the first arcuate slot, and a rotatable cutting wheel moveable along the second arcuate slot.

In yet another aspect, the present subject matter provides a C-type tubing cutter comprising a housing that defines a cutting wheel slot and a work region for receiving a workpiece to be cut. The cutter also comprises a spring biased cutting wheel positionable within the cutting wheel slot. The cutting wheel is biased toward one end of the slot. The cutter also comprises a radially positionable roller carriage having at least one roller. And, the cutter also comprises a size indexing assembly for selectively positioning the roller carriage relative to the cutting wheel in one of a plurality of predetermined positions corresponding to sizes of workpieces.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

The present subject matter provides C-type tubing cutters that can be used to cut a range of different size tubings, pipes, or other workpieces. Although the terms "tube" or "tubing" are generally used herein, it will be understood that the present subject matter cutters can be used to cut or sever a variety of other types of workpieces. In many embodiments, the cutters utilize a size indexing assembly that selectively accommodates one of several discrete sizes of tubing. The size indexing assembly can be quickly and easily adjusted so that the cutter can receive and cut different size tubing.

In certain embodiments, the tubing cutters feature a roller carriage that is selectively positionable. Generally, the roller carriage is radially positionable. The roller carriage can be selectively locked in one of a plurality of discrete predetermined positions by a moveable trigger. Specifically in many versions of the cutter, the trigger is slideable along an arcuate slot provided in the housing and biased toward a locking position. When the trigger is disposed in the locked position, the trigger engages the roller carriage and locks the carriage in a particular radial position.

The cutters can be adjusted or configured to accommodate a different size tube by moving the trigger to an unlocked position, thereby disengaging the trigger from the roller carriage. The roller carriage is then radially positionable. The carriage can be biased radially inward or outward by a spring or other biasing member for example. The carriage is moved to a desired radial position, and then locked in that position by moving the trigger from the unlocked position to the locked position.

In certain embodiments, the cutters also feature a recessed slot or receiving region along an outer circumferential wall that is shaped and sized to receive a screwdriver or other member. Upon insertion of an end of the screwdriver for example, a user can apply increased torque to the cutter by applying a rotational moment force to the screwdriver.

In certain embodiments of the cutters, the blade of the cutter is also positionable along an arcuate slot and biased inward by a flat spring or other biasing member upon which the blade and/or its axle are mounted. These and other aspects of the cutters of the present subject matter are described in association with the referenced figures as follows.

Figure 1:
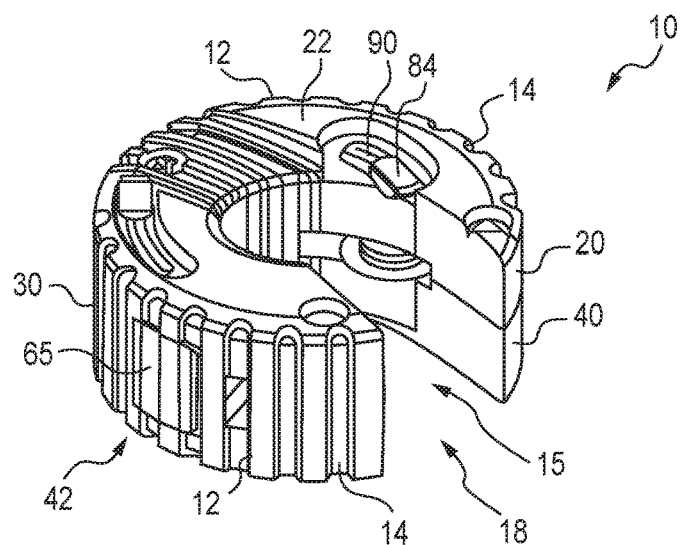
FIG. 1 is a perspective view of an embodiment of a cutter in accordance with the present subject matter.
Figure 2:
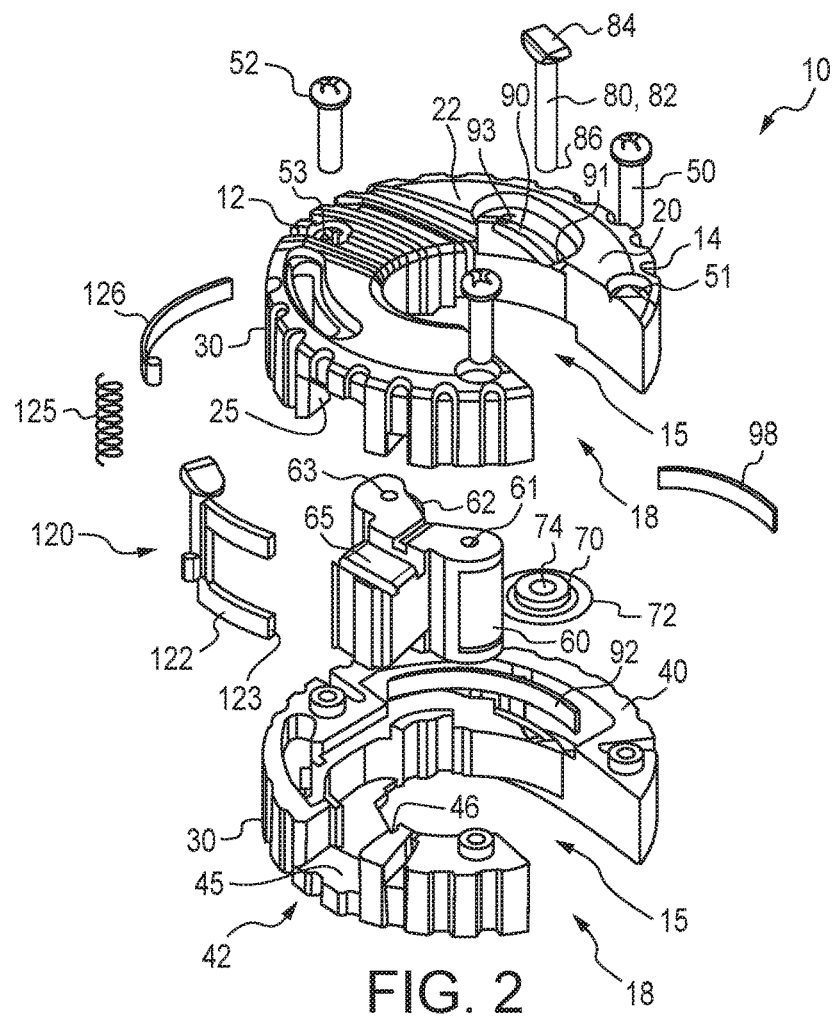
FIG. 2 is an exploded assembly view of the cutter of FIG. 1.

FIG. 1 is a perspective view of an embodiment of a C-type tubing cutter 10 in accordance with the present subject matter. FIG. 2 is an exploded assembly view of the cutter 10. The tubing cutter 10 comprises two or more separable and interengaging first and second housing portions 20 and 40, respectively. The housing portions are configured such that upon engagement and contact with each other, the housing portions form a generally cylindrically shaped housing defining a first outer face 22 provided by the first housing portion 20, and a second outer face 42 provided by the second housing portion 40. The second face 42 is oppositely directed relative to the first face 22. In many embodiments, the faces 22 and 42 are oriented parallel to each other. The housing also includes a circumferential wall 30 extending between the first and second faces 22, 42. Portions of the wall 30 may be integrally formed with the housing portions 20 and/or 40. The housing may also include one or more ridges 12 and/or depressions 14 extending between the faces 22 and 42 and disposed on or formed within the circumferential wall 30 or region of the housing to promote gripping of the cutter 10. Although a two component cylindrical housing has been generally described, it will be appreciated that the present subject matter includes a variety of other shapes and/or configurations for the housing of the tubing cutter.

The cutter 10, and more particularly the housing portions 20 and 40, define a work region 15 which is sized and shaped to receive a tube, pipe, conduit or other workpiece to be cut. Typically, the work region extends between the faces 22 and 42 and is cylindrical in shape or substantially so. The work region 15 is also radially accessible by an access port 18. The access port 18 is also sized and shaped to enable a tube, pipe, conduit, or other workpiece to be positioned within the work region 15 of the cutter 10 without having to access an end of the tube, pipe, conduit, or other workpiece.

The cutter 10 also comprises at least one roller 60 and in many embodiments, a pair of cylindrical rollers 60 and 62. The roller(s) such as rollers 60, 62, is rotatably supported by a roller carriage 65, and specifically by associated axles 61 and 63, respectively. In the cutter version shown in FIGS. 1 and 2, the first roller 60 includes an axle 61 and the second roller 62 includes an axle 63. The rollers 60 and 62 are at least partially accessible and exposed within the work region 15 of the cutter 10. It will be understood that that present subject matter is not limited to this particular assembly, and instead includes a range of variant assemblies and components for rotatably engaging one or more rollers in the housing of the cutter. The roller carriage 65 is radially positionable within a passage 25, 45 defined in the housing portions 20, 40 respectively.

The cutter 10 also includes one or more fasteners such as fasteners 50, 52, for securing the housing portions 20 and 40 together. The fasteners 50, 52 are disposed in corresponding apertures in one or both of the housing portions such as for example, apertures 51 and 53 respectively, defined in the first housing portion 20. In many embodiments, the fasteners 50, 52 are in the form of threaded fasteners. Corresponding threaded receiving regions can be provided in the other housing portion such as the second housing portion 40. Thus, the housing portions are secured together by the first fastener 50 extending through the aperture 51 defined in the first housing portion 20 and being threadedly engaged in the corresponding receiving region (not shown) provided in the second housing portion 40; and the second fastener 52 extending through the aperture 53 defined in the first housing portion 20 and being threadedly engaged in a corresponding receiving region (not shown) provided in the second housing portion 40. It will be understood that the present subject matter cutters are not limited to this particular assembly and instead includes other arrangements, techniques, and/or components for securing the housing portions together.

The cutter 10 also includes a cutting wheel 70 and an axle pin 80. The cutting wheel 70 defines an outer circumferential cutting edge 72 and a central bore 74 for receiving the axle 80. The axle pin 80 defines a shaft 82 extending between an enlarged head end 84 and a distal end 86. In certain versions, the enlarged head 84 is rectangular shaped. The bore 74 and/or the shaft 82 are sized so that upon insertion of the axle pin 80 into the bore 74 of the wheel 70, the wheel 70 can rotate about the axle pin 80, to thereby form a wheel and axle assembly. As described in greater detail herein, the cutting wheel 70 is generally received within and disposed between the housing portions 20, 40. The cutting wheel 70 is at least partially accessible and exposed within the work region 15 of the cutter 10. The axle pin 80 is slidably disposed within a cutting wheel slot 90 defined in one or both of the first and second housing portions 20, 40. These and other aspects are described in greater detail herein. In certain embodiments, the cutter 10 also comprises springs 92 and 98 that bias the wheel 70 to a particular position and a leaf spring 126 which pushes on a hub of cutter wheel 70 thus biasing the cutter wheel toward opening 15. The springs 92 and 98 are each typically in the form of a leaf spring that is positioned within a hollow interior region of the cutter 10 such as in the cutting wheel slot 90 for example, that contacts the axle pin 80 and urges the axle pin 80 and cutting wheel 70 radially inward. Due to the orientation of the slot 90, the axle pin 80 and cutting wheel 70 are urged toward one end 91 of the slot 90. Upon insertion of a workpiece within the work or cutting region of the tool, the cutting wheel 70 is displaced within the slot 90 toward the other slot end 93 against the biasing action of the springs 92 and 98. As cutting is performed, the wheel 70 is biased and moved toward the end 91 of the slot 90. As will be understood, the slot 90 is oriented within the housing such that the slot end 91 is closer to a center of the cutting region than the slot end 93. Although a leaf spring is used in many versions, the present subject matter includes the use of other biasing members instead of, or in addition to, leaf springs 92 and 98.

In particular versions of the cutters, a size indexing assembly is provided which enables convenient and quick adjustment of the cutting size and/or configuration of the cutter. Thus, use of the size indexing assembly enables a cutter to be easily switched between one of a plurality of configurations for cutting tubing of different sizes. For example, a cutter can be provided with a two-size indexing assembly that enables a user to quickly change the cutter to cut a larger or smaller tube. Adjustment of the size indexing assembly does not require tedious radial positioning of roller(s) or of a cutting wheel. Instead, a user merely unlocks the roller carriage using a slidable trigger, moves the roller carriage to a new desired position, and then locks the carriage in that position by returning the trigger to its locked position. Size adjustment is typically performed prior to placement of a workpiece within the work or cutting region of the tool. However, the present subject matter includes tool versions and/or methods in which size adjustment occurs during and/or after placement of a workpiece within the work or cutting region.

Figure 3:
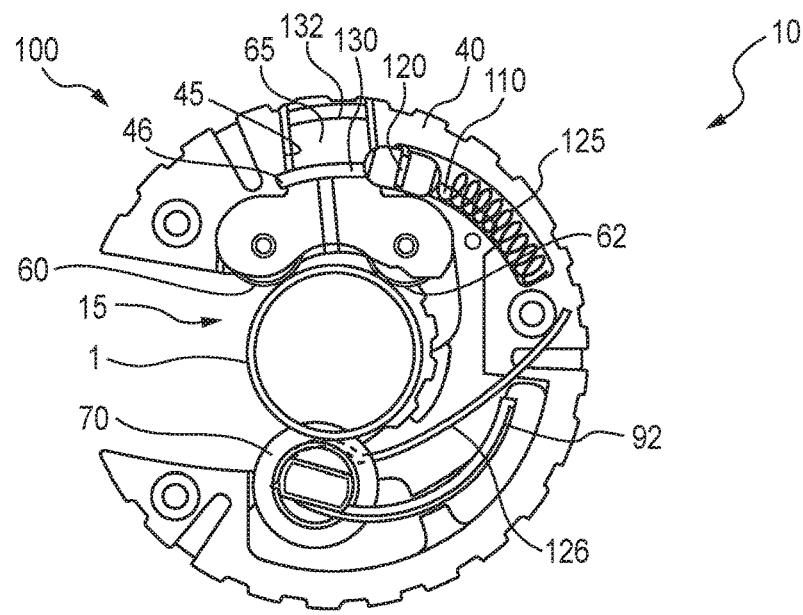
FIG. 3 is a schematic side view of the cutter of FIG. 1 having a housing portion removed, illustrating a roller carriage and portions of a locking assembly.
Figure 4:
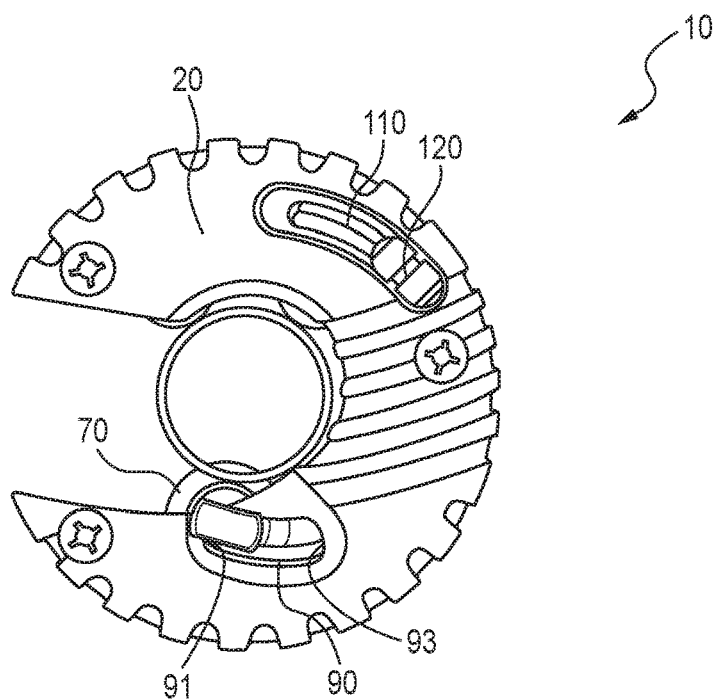
FIG. 4 is another schematic side view of the cutter of FIG. 1 with its housing portion attached and cutting a workpiece.

Referring to FIGS. 3 and 4, the cutter 10 is shown in FIG. 3 without the housing portion 20 and in FIG. 4 with the housing portion 20 assembled to the housing portion 40. A workpiece 1 is disposed in the work region 15 of the cutter 10 and in contact with the rollers 60, 62 of the roller carriage 65 and the cutting wheel 70.

Generally, the size indexing assembly designated as 100 in the referenced figures includes a trigger slot 110 defined in the housing and which is accessible along an exterior of the housing. The size indexing assembly 100 also includes a moveable trigger 120 (also shown in FIG. 2) selectively positionable along the trigger slot 110 and a compression spring 125 which biases moveable trigger 120 toward roller carriage 65. And, the size indexing assembly 100 further includes a plurality of engagement regions such as 130 and 132 provided on or otherwise within the roller carriage 65 and configured for selective engagement with the trigger 120. Each engagement region such as 130 and 132 corresponds to a predetermined radial position of the roller carriage 65. For example referring to FIG. 3, a first radial position of the roller carriage 65 occurs upon engagement between the trigger 120 and the engagement region 130; and a second radial position of the roller carriage 65 occurs upon engagement between the trigger 120 and the engagement region 132. In this representative embodiment, upon configuring the cutter 10 such that the roller carriage 65 is disposed in the noted first radial position, the cutter 10 can accommodate and cut a workpiece having a larger size than if the cutter is configured such that the roller carriage 65 is disposed in the noted second radial position. FIG. 3 depicts the trigger 120 in a locked position where the trigger is held in this position due to the reaction force from compression spring 125. FIG. 4 depicts the trigger in an unlocked position which causes compression of compression spring 125.

Referring to FIGS. 2 and 3, additional details of the trigger 120 and its relationship with the trigger slot 110 are as follows. The trigger 120 can be provided with one or more prongs 122 that define distal ends 123. The prongs 122 are sized and shaped to be slidably disposed in the cutter housing. In certain embodiments, a capture region 46 is provided in one or both housing portions 20, 40 such that upon positioning the trigger 120 to a locked position, the ends 123 of the trigger prongs 122 are received within the capture region 46 to thereby further secure the roller carriage 65 within the passage 25, 45 defined in the housing.

Figure 5:
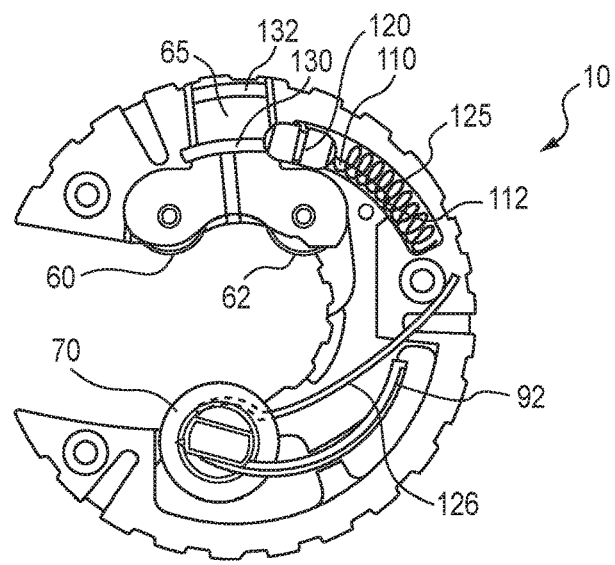
FIG. 5 is another schematic side view of the cutter of FIG. 1 without the noted housing portion.
Figure 6:
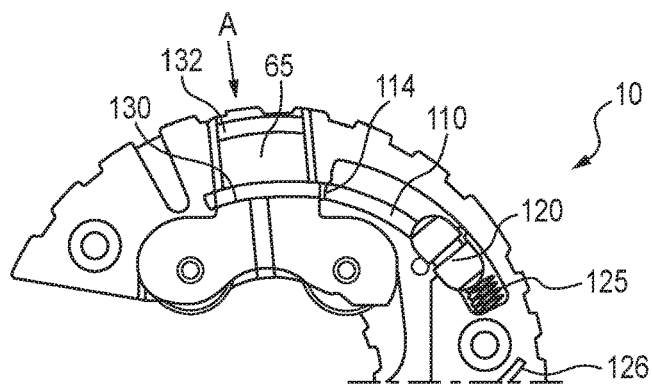
FIG. 6 is a partial view of the cutter of FIG. 1 without the noted housing portion showing the locking assembly and roller carriage.
Figure 7:
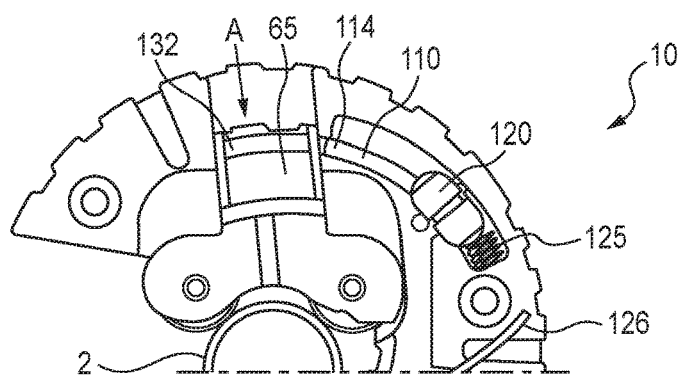
FIG. 7 is another partial view of the cutter of FIG. 1 showing the locking assembly and roller carriage in a different position.

FIGS. 5-7 illustrate the cutter 10 having its housing portion 20 removed to further illustrate operation and positioning of components of the cutter. As noted, the size indexing assembly 100 enables the cutter 10 to be quickly and conveniently configured to accommodate one of several predetermined workpiece sizes. For example, if the cutter is in a configuration such as shown in FIG. 3 for cutting a relatively large size workpiece 1, the cutter can be reconfigured to accommodate and cut a smaller size workpiece 2 as shown in FIGS. 5-7. The trigger 120 is moved along the trigger slot 110 from a slot end 114 to or towards a slot end 112 to thereby disengage the trigger 120 from the first engagement region 130 of the roller carriage 65. Upon disengagement, the roller carriage 65 is then positioned radially inward such as in the direction of arrow A in FIGS. 6 and 7 until the second engagement region 132 is aligned with the trigger slot 110 as shown in FIG. 7. At the configuration depicted in FIG. 7, the roller carriage 65 can be locked in that position by moving the trigger 120 from slot end 112 to or towards the slot end 114 to thereby engage the trigger 120 with the second engagement region 132 of the roller carriage 65.

Figure 8:
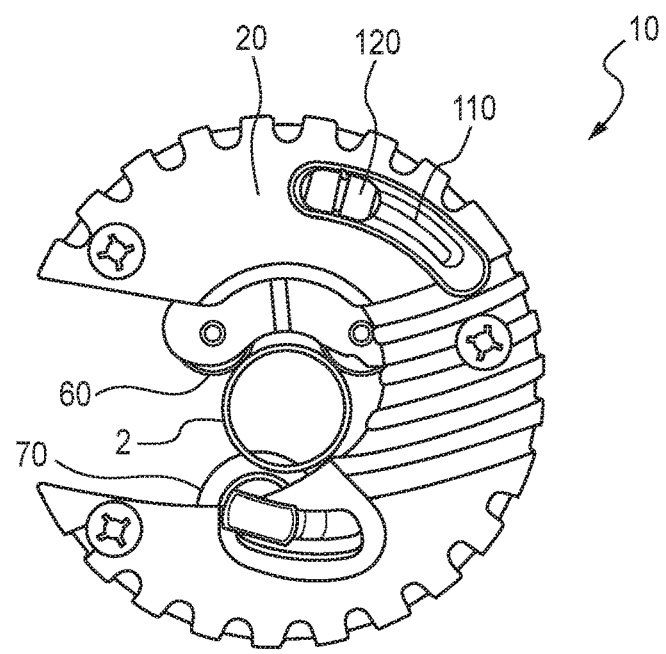
FIG. 8 is another schematic side view of the cutter of FIG. 1 cutting a workpiece having a smaller diameter than the workpiece depicted in FIG. 4.

FIG. 8 illustrates the fully assembled cutter 10 and the workpiece 2 when the cutter is in the configuration described and shown in FIG. 7.

Figure 9:
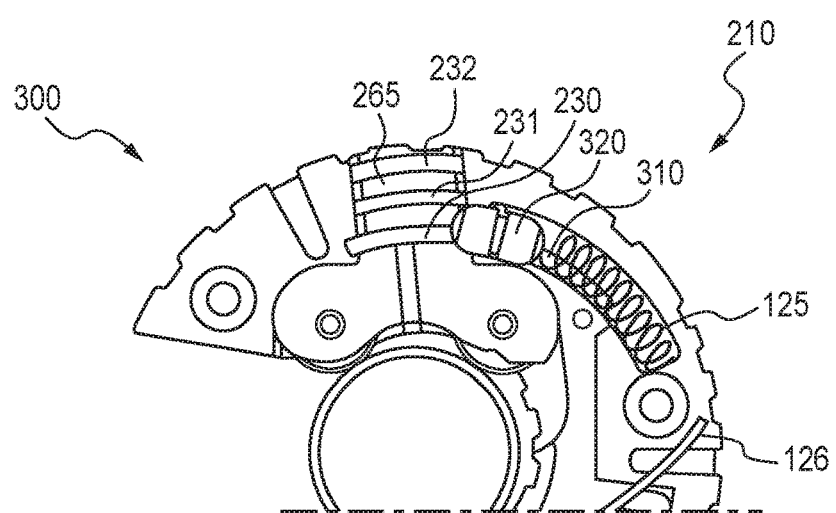
FIGS. 9-11 are partial views of another embodiment of a cutter in accordance with the present subject matter, showing various positions of the roller carriage and the locking assembly with a housing portion removed.
Figure 10:
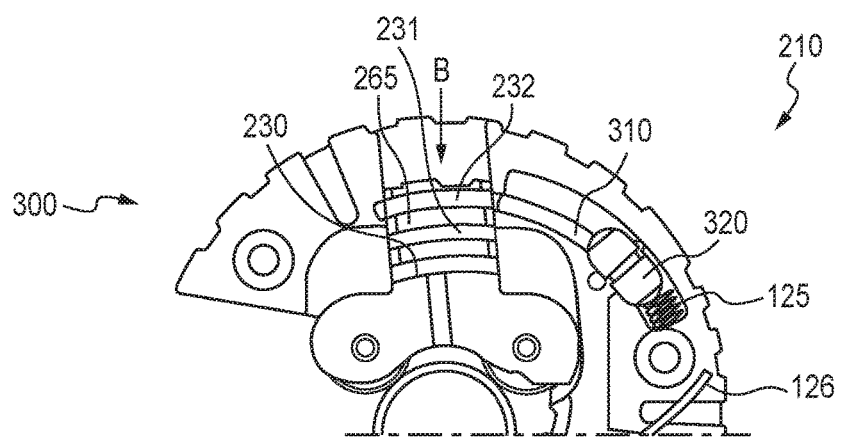
Figure 11:
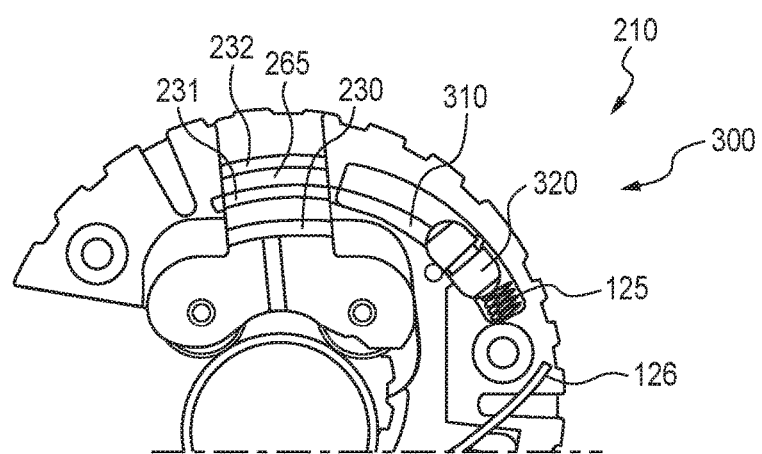

FIGS. 9-11 illustrate another embodiment of a cutter 210 having a size indexing assembly 300 that provides for cutting three different workpiece sizes. This is a nonlimiting example of a three-size indexing assembly. The cutter 210 comprises a radially positionable roller carriage 265 that includes engagement regions 230, 231, and 232. The cutter 210 and size indexing assembly 300 include a trigger slot 310 defined in the housing and which is accessible along an exterior of the housing. The cutter 210 and size indexing assembly 300 also include a moveable trigger 320 selectively positionable along the trigger slot 310. The cutter 210 and size indexing assembly 300 additionally include the noted engagement regions 230, 231, and 232 disposed on or otherwise within the roller carriage 265 and configured for selective engagement with the trigger 320. Each engagement region such as 230, 231, and 232 corresponds to a predetermined radial position of the roller carriage 265. As will be understood, the roller carriage can be positioned to a desired radial position according to the size of the workpiece to be cut by movement of the roller carriage 265 in the direction of arrow B for example shown in FIG. 10.

Figure 12:
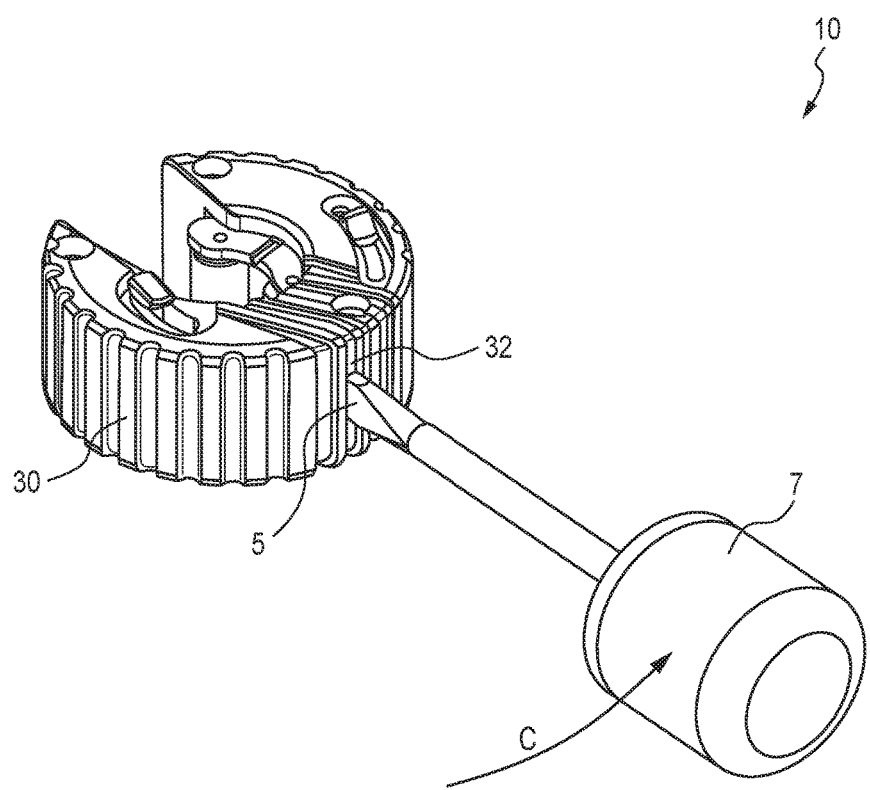
FIG. 12 is a perspective view illustrating engagement between the cutter of FIG. 1 and a screwdriver.

FIG. 12 illustrates another aspect that can be incorporated in the present subject matter cutters. For example, the previously described cutter 10 can be provided with one or more recessed region(s) 32 defined along the circumferential wall 30 of the cutter. The recessed region(s) 32 is adapted, i.e., sized and shaped, to receive an end 5 of a screwdriver 7 or other member. A user can apply increased torque to the cutter 10 by applying a rotational moment force to the screwdriver 7 denoted as arrow C in FIG. 12.

In many embodiments of the present subject matter cutters, the slots defined in the housing such as for example the cutting wheel slot 90 and/or the trigger slot 110, 310, are arcuate in shape. That is, the cutting wheel slot and/or the trigger slot extends along an arc or curve between its ends. However, it will be appreciated that the present subject matter includes the use of non-arcuate slots such as linear straight slots or stepped slots. In many embodiments, the cutting wheel slot 90 and/or the trigger slot 110, 310 extends between and is accessible along the first and second faces of the housing, i.e., 22 and 42. However, the present subject matter includes cutters in which the slot(s) is accessible on only one face.

The tubing cutters of the present subject matter are constructed of conventional materials known and/or used in the field of tools. The housing components can be formed from suitable polymeric materials and the cutting wheel is typically steel or other metal(s). The tubing cutters and their associated work regions and access ports are appropriately sized to accommodate tubing having an outer diameter within a range of from about 0.125 inch (3.175 mm) to about 1.5 inch (38.1 mm). Typical sizes for tubing include 0.5 inch (12.7 mm) and 0.75 inch (19.05 mm). However, the present subject matter includes sizing and configuring the cutters to accommodate tubes, pipes, conduits, or other workpieces smaller or larger than the noted representative range.

Many of the embodiments of the cutters enable a user to cut different size tubings or other workpieces by simply unlocking the trigger, and place the cutter onto a tube that may be the same size or of a different size than that of a previous tube cut by the cutter. Unlocking the trigger thereby disengages the roller carriage and allows the roller carriage to be radially positionable. For cutters having roller carriages biased radially inward, a user can simultaneously urge the roller carriage outward when positioning the cutter on a larger diameter tube. When positioning the cutter on to a smaller diameter tube, the roller carriage is biased radially inward to a new radial position corresponding to the smaller diameter tube.

Although the various embodiments of cutters have been described in association with two-size and three-size indexing assemblies, it will be understood that the present subject matter includes cutters with indexing assemblies that accommodate a plurality of different discrete workpiece sizes such as for example from 2 to 10 sizes, particularly 2-6 sizes, and in many embodiments 2-4 different sizes.

Although the present subject matter cutters have been primarily described in association with C-type cutters, it will be understood that the present subject matter is not limited to C-type cutters. Instead, the present subject matter may be embodied in a variety of different types of cutters and tools.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A tubing cutter comprising:
   a housing defining a work region for receiving a workpiece to be cut;
   a radially positionable roller carriage having at least one roller accessible along the work region of the housing;
   a cutting wheel supported within the housing and accessible along the work region of the housing;
   a size indexing assembly for selectively positioning the roller carriage relative to the cutting wheel in one of a plurality of predetermined positions corresponding to sizes of workpieces,
   wherein the housing defines a trigger slot formed in the housing and accessible along an exterior of the housing,
   wherein the size indexing assembly includes a moveable trigger selectively positionable along the trigger slot,
   wherein the trigger slot is arcuate,
   wherein the trigger is positionable along the trigger slot between a locked position and an unlocked position.

2. The tubing cutter of claim 1 wherein the size indexing assembly further includes a biasing member urging the trigger toward the locked position.

3. The tubing cutter of claim 1 wherein the housing also defines an arcuate slot accessible along the exterior of the housing, the tubing cutter further comprising:
   an axle moveable along the arcuate slot, wherein the axle rotatably supports the cutting wheel.

4. The tubing cutter of claim 3 further comprising:
   a biasing member urging the axle toward an end of the arcuate slot.

5. The tubing cutter of claim 1 wherein the housing further defines a first outer face, a second outer face oppositely directed from the first face, and a circumferential outer wall extending between the first and second faces, the circumferential wall having a recessed region configured to receive an end of a screwdriver.

6. A tubing cutter comprising:
   a housing defining a work region for receiving a workpiece to be cut;
   a radially positionable roller carriage having at least one roller accessible along the work region of the housing;
   a cutting wheel supported within the housing and accessible along the work region of the housing;
   a size indexing assembly for selectively positioning the roller carriage relative to the cutting wheel in one of a plurality of predetermined positions corresponding to sizes of workpieces;
   wherein the size indexing assembly includes:
   (i) a trigger slot formed in the housing and accessible along an exterior of the housing,
   (ii) a moveable trigger selectively positionable along the trigger slot,
   (iii) a plurality of engagement regions on the roller carriage and configured for selective engagement with the trigger, wherein each engagement region corresponds to a predetermined radial position of the roller carriage.

7. The tubing cutter of claim 6 wherein upon positioning the trigger to the locked position, the trigger engages at least one of the engagement regions of the roller carriage and thereby secures the roller carriage to a fixed position relative to the housing.

8. A tubing cutter comprising:
   a housing defining a first outer face, a second outer face oppositely directed from the first face, a work region for receiving a workpiece to be cut and a trigger slot, wherein the trigger slot is accessible along at least one of the first and second outer faces;
   a trigger moveable along the trigger slot;
   at least one selectively and radially positionable roller accessible in the work region;
   a cutting wheel rotatably supported by the housing and accessible in the work region;
   wherein the roller can be affixed in a desired radial position by the trigger,
   wherein the housing also defines an arcuate slot accessible along an exterior of the housing, the tubing cutter further comprising:

an axle moveable along the arcuate slot, wherein the axle rotatably supports the cutting wheel.

9. The tubing cutter of claim 8 wherein the at least one roller is rotatably supported by a radially positionable roller carriage, the trigger is positionable between a locked position and an unlocked position, and wherein upon positioning the trigger to the locked position, the trigger engages the roller carriage and thereby secures the at least one roller rotatably supported thereon to a fixed position relative to the housing.

10. The tubing cutter of claim 8 further comprising:
a biasing member urging the axle toward an end of the arcuate slot.

11. The tubing cutter of claim 8 wherein the housing further defines a circumferential outer wall extending between the first face and the second face, the circumferential wall defining a recessed region adapted to receive an end of a screwdriver.

12. A tubing cutter comprising:
a housing defining a first outer face, a second outer face oppositely directed from the first face, a work region for receiving a workpiece to be cut and a trigger slot, wherein the trigger slot is accessible along at least one of the first and second outer faces;
a trigger moveable along the trigger slot;
at least one selectively and radially positionable roller accessible in the work region;
a cutting wheel rotatably supported by the housing and accessible in the work region;
wherein the roller can be affixed in a desired radial position by the trigger,
wherein the at least one roller is rotatably supported by a radially positionable roller carriage, the trigger is positionable between a locked position and an unlocked position, and wherein upon positioning the trigger to the locked position, the trigger engages the roller carriage and thereby secures the at least one roller rotatably supported thereon to a fixed position relative to the housing, and
a biasing member urging the trigger to the locked position.

13. A tubing cutter comprising:
a housing having a first outer face, a second outer face oppositely directed from the first outer face, and defining a work region for receiving a workpiece to be cut, the housing defining a first arcuate slot and a second arcuate slot, both the first and second arcuate slots accessible along the first outer face of the housing;
a moveable trigger positionable within the first arcuate slot;
a rotatable cutting wheel rotatably mounted on an axle pin which is moveable along the second arcuate slot.

14. The tubing cutter of claim 13 further comprising:
a radially positionable roller carriage having at least one roller accessible in the work region of the housing, the roller carriage engageable with the trigger to thereby affix the roller carriage to a particular radial position relative to the housing.

15. The tubing cutter of claim 13 wherein the housing includes a circumferential wall adjoining the first and the second outer faces, the circumferential wall defining a recessed region adapted to receive an end of a screwdriver.

16. A tubing cutter comprising:
a housing having an outer face and defining a work region for receiving a workpiece to be cut, the housing defining a first arcuate slot and a second arcuate slot, both the first and second arcuate slots accessible along the outer face of the housing;
a moveable trigger positionable within the first arcuate slot;
a rotatable cutting wheel rotatably mounted on an axle pin which is moveable along the second arcuate slot;
a radially positionable roller carriage having at least one roller accessible in the work region of the housing, the roller carriage enageable with the trigger to thereby affix the roller carriage to a particular radial position relative to the housing;
wherein the trigger is positionable within the first arcuate slot between a locked position at which the trigger engages the roller carriage, and an unlocked position, the tubing cutter further comprising:
a biasing member urging the trigger toward the locked position.

17. A tubing cutter comprising:
a housing having an outer face and defining a work region for receiving a workpiece to be cut, the housing defining a first arcuate slot and a second arcuate slot, both the first and second arcuate slots accessible along the outer face of the housing;
a moveable trigger positionable within the first arcuate slot;
a rotatable cutting wheel rotatably mounted on an axle pin which is moveable along the second arcuate slot;
a radially positionable roller carriage having at least one roller accessible in the work region of the housing, the roller carriage engageable with the trigger to thereby affix the roller carriage to a particular radial position relative to the housing;
wherein the roller carriage includes a plurality of engagement regions on the roller carriage and configured for selective engagement with the trigger, each engagement region corresponding to a predetermined radial position of the roller carriage.

18. A C-type tubing cutter comprising:
a housing having a first outer face, a second outer face oppositely directed from the first outer face, and defining a cutting wheel slot and a work region for receiving a workpiece to be cut, the cutting wheel slot accessible along at least one of the first outer face and the second outer face of the housing;
a spring biased cutting wheel rotatably mounted on an axle pin which is positionable within the cutting wheel slot, the axel pin and the cutting wheel biased toward one end of the slot;
a radially positionable roller carriage having at least one roller;
a size indexing assembly for selectively positioning the roller carriage relative to the cutting wheel in one of a plurality of predetermined positions corresponding to sizes of workpieces.

19. A C-type tubing cutter comprising:
a housing defining a cutting wheel slot and a work region for receiving a workpiece to be cut;
a spring biased cutting wheel rotatably mounted on an axle pin which is positionable within the cutting wheel slot, the axel pin and the cutting wheel biased toward one end of the slot;
a radially positionable roller carriage having at least one roller;

a size indexing assembly for selectively positioning the roller carriage relative to the cutting wheel in one of a plurality of predetermined positions corresponding to sizes of workpieces, wherein the size indexing assembly includes:

(i) a trigger slot formed in the housing and accessible along an exterior of the housing, (ii) a moveable trigger selectively positionable along the trigger slot, (iii) a plurality of engagement regions on the roller carriage and configured for selective engagement with the trigger, wherein each engagement region corresponds to a predetermined radial position of the roller carriage.

20. The C-type tubing cutter of claim 19 wherein the trigger slot is arcuate.

21. The C-type tubing cutter of claim 19 wherein the trigger is positionable between a locked position and an unlocked position.

22. The C-type tubing cutter of claim 21 wherein upon positioning the trigger to the locked position, the trigger engages at least one of the engagement regions of the roller carriage and thereby secures the roller carriage to a fixed position relative to the housing.

23. The C-type tubing cutter of claim 21 wherein the size indexing assembly further includes a biasing member urging the trigger toward the locked position.

* * * * *